Oct. 2, 1962  A. LAW  3,056,361
DOUGH PROVING DEVICES
Filed April 10, 1961
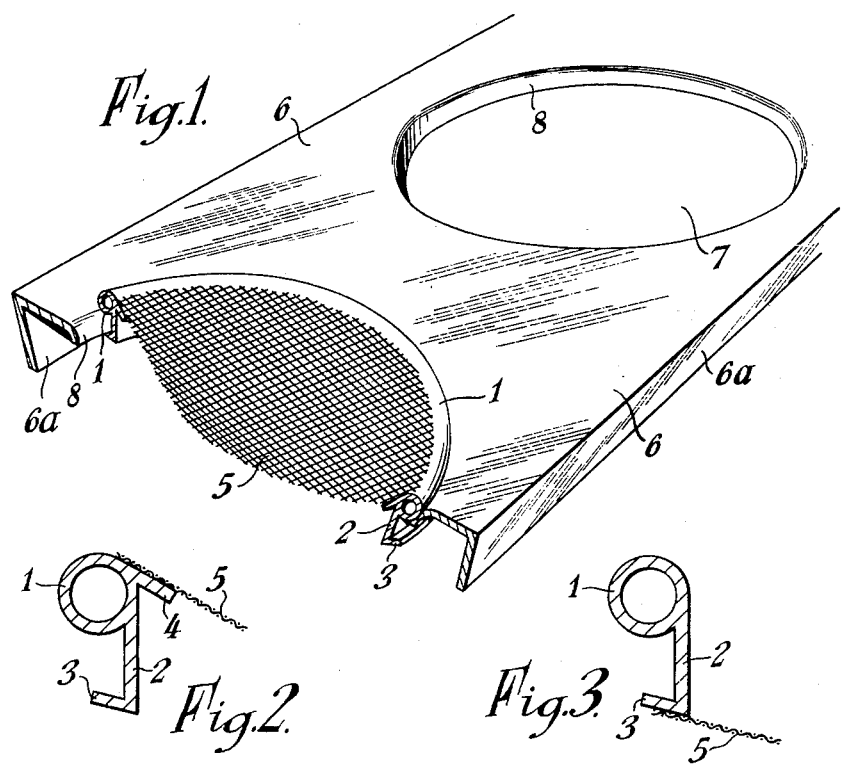
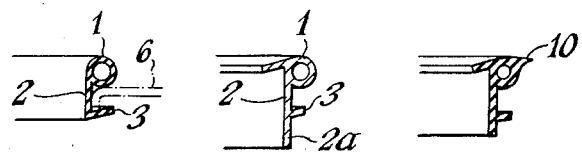
Fig.7  Fig.8  Fig.9  Fig.10
INVENTOR
ALLAN LAW
BY  Kenwood Ross
ATTORNEY

United States Patent Office 3,056,361
Patented Oct. 2, 1962

3,056,361
DOUGH PROVING DEVICES
Allan Law, 34 Cliff St., Rishton, Blackburn, England
Filed Apr. 10, 1961, Ser. No. 101,738
Claims priority, application Great Britain Apr. 13, 1960
2 Claims. (Cl. 107—7)

This invention relates to dough prover pockets, which are carriers for individual batches of bread dough in a dough proving machine, being intended to carry the dough through a proving place and then, by inversion, to tip it out. The pockets of this invention may however be used in similar situations where separate dough batches require to be carried from one apparatus to another or merely to be stored temporarily for a period of time.

A common practice in the baking industry at the present time is to employ textile proving cloths which are wide strips of a close-knitted type of material, these strips being hemmed on two longitudinal edges to receive stiffening rods or bars, and each being mounted on a metal plate having a number of circular openings along its longitudinal centre line and being held in place by said rods or bars. In each of these said openings hangs a pouch or pocket attached to said cloth strip and made of similar material, the pouches receiving the batches of dough which, by mechanical handling of said plates, are carried to their destination, whereafter the plates are inverted to cause the dough batches to leave the pockets.

The principal drawbacks to this known method is that the dough in the pocket tends to stick to the cloth of which the pocket is made, and this leads to two difficulties. First it makes withdrawal of the dough from the pocket difficult, and makes the automatic discharge of the dough uncertain, which is especially disadvantageous in those cases where the carrier is eventually tipped so as to discharge the dough batches on to the input conveyor of a proving and rolling machine and, secondly, the cloth of which the pocket is made becomes soiled with an attached skin or fragments of dough and requires frequent washing and cleaning. Owing to the pouch shape of the pockets, and the flexibility of the material of which they are made, the complete removal of residual dough from them is not always easy.

It is therefore the object of the present invention to provide improved forms of dough prover pocket which are free from all the objections of the above-described known arrangement, and in which, as a consequence, since the dough does not stick to the carriers the dough batches are more easily discharged from the pockets, and the pockets do not require washing so frequently nor so severely as with the known arrangements.

A dough prover pocket according to this invention comprises a flexible integral network of a non-toxic synthetic plastic material, washable in water, said network being provided with or attached to a surrounding rim or frame of the same or similar material by which it may be removably supported in the aperture of a metal or other carrier. The said rim or frame will usually include an outwardly-projecting portion to lie on said carrier around the edge of the said aperture to constitute a support for the net and, according to a further feature of the invention it includes also a resilient outwardly-projecting portion adapted to snap under the edge of a downwardly-directed flange around said aperture carrier so as to retain the pocket on the carrier when the latter is inverted for discharge of the dough out of the pocket. The pockets may be round in plan or elliptical or of other shape, according to the shape of the aperture which they are to fit.

By an integral network is meant one that is formed without joints in one operation, as by injection moulding or compression moulding and so that, as distinct from a woven or knitted network, there are no cavities between crossing parts for the collection of dough. Suitable non-toxic plastic materials from which the network may be formed are, for example, polyethylene, polyvinyl chloride, nylon, acrylic resins and others.

In some forms of the invention the network and the said rim or frame are made as a single integral unit, as by injection moulding, with high or low pressure in dependence on the plastic material being used. In other forms of the invention however, first the said rim or frame is made separately, either as an endless unit or by joining the abutting ends of an extruded strip cut to appropriate lengths, and a separately-made network is then secured to such rim or frame, as by high frequency welding, or otherwise (including stitching) according to the type of material in question. The said rim or frame may be shaped at its top edge to receive and hold the network or, in other cases the network may be attached to the lower part of the rim or frame.

According to a preferred embodiment of the invention therefore, the improved dough-prover pocket comprises a peripheral wall having a radially-outward protuberance (solid or tubular) at the top edge to rest on a carrier around an aperture therein, and having at the lower edge a radially-outward, slightly upwardly inclined protuberance to snap under a downward flange bounding said aperture, and comprises also an integral or attached network disc carried by one or other of said protuberances the interior profile of the surrounding parts of the pocket being such as to offer no obstruction to the falling of the dough out of the pocket when inverted. In an alternative embodiment the said network is attached to the lower protuberance of the rim, this then serving not only to carry the network but also to "snap" under the retaining rim or flange around the said aperture in the carrier. It is visualized that these forms of the invention will be used in connection with elongated metal or like slats or carriers arranged side by side in series as an endless conveyor, each such carrier having a number of the downwardly-flanged openings, to receive individual prover pockets.

The arrangement is such that the diameter of the said aperture at the bottom of its flange is slightly smaller than the overall diameter of the lowermost annular protuberance on the rim of the pocket, so that the lower part of that rim needs to be worked through the aperture and eventually snapped under the bottom edge of the flange, whereby the pocket is retained in position even when the slat is turned upside down. The depth of the rim around the pocket is such that the upper protuberance rests on the top of the carrier when the said flange on the rim engages below the flange around the aperture.

The invention will now be described with reference to the accompanying drawing wherein:

FIG. 1 is a part sectional perspective view of one embodiment of the improved pocket located in a carrier, also in section;

FIG. 2 is an enlarged cross section through the outer portion of the pocket shown in FIG. 1;

FIG. 3 is a diametral section through a modified form of the improved pocket;

FIG. 4 is a view similar to FIG. 3 but with the pocket in position on a slat or lath of a conveyor;

FIG. 5 is a cross-section through the rim portion of a modified form of the improved pocket incorporating a cylindrical wall extension;

FIG. 6 is a view similar to FIG. 5 of a modified form of the invention incorporating a peripheral ear and a cylindrical wall extension;

FIG. 7 is a view similar to FIG. 5 of a modified form of the invention incorporating a peripheral ear;

FIG. 8 is a view similar to FIG. 5 of a modified form of the invention incorporating a solid rib and a cylindrical wall extension;

FIG. 9 is a view similar to FIG. 5 of a modified form of the invention incorporating a solid rib; and FIG. 10 is a cross section through the rim portion of the embodiment shown in FIGS. 1 and 2, with the netting removed.

Referring first to FIGS. 1 and 2, the dough prover pocket there shown is made in two parts, namely a rim part and a net part and these are secured together peripherally, by welding in the example shown though the connection could be made by stitching. The rim is formed initially as an extrusion and then has its ends joined to form an annulus (it could be made as a moulding) and comprises a hollow round-sectioned rib 1 at the top, a cylindrical wall 2 and an upwardly-inclined external flange 3 at the bottom and there is also an inwardly directed, downwardly-inclined flange 4 at the top the upper face of which is tangential to the curvature of the hollow rib. To the upper face of this flange 4 is welded the marginal part of an integral plastic netting 5 of disc form, the netting being of a slightly concave or bag shape and providing a flexible bottom for the pocket. Instead of the rib 1 being hollow it could of course be solid.

As shown more particularly in FIG. 1, the pockets are carried by metal slats or laths 6, each having along its outer edge a downwardly-turned outer flange 6a for strengthening purposes, and having spaced apertures 7 to receive the pockets, the inner edge of each aperture having a downwardly directed inclined flange 8. The dimensions of the inter-engaging parts of the pocket and aperture are such that with the said rib or rim 1 resting on the top of the carrier 6 and the cylindrical wall 2 lying on the said flange 8, the upwardly-inclined flange 3 of the pocket engages below the said metal flange 8, and retains the pocket in position. It is possible therefore, when the slat is turned upside down, even for the netting 5 to reverse its concavity but without the pocket loosening or releasing itself from the flanged aperture. Although in the drawing the flange 4 is shown as of uniform thickness it could in some cases taper to an edge.

In FIG. 3 the net 5 is shown as attached to the flange 3 at the bottom of the rim part. Here also the attachment may be by welding, stitching or otherwise.

The rim part of the pocket, when not made as a moulding, is first made as an extruded strip as shown for example in FIGS. 2 or 5. In FIG. 4 the flange 3 is of greater width than as shown in FIGS. 2 and 3, so as to provide a larger welding area in contact with the net, any surplus material after welding being torn away.

In a modification of this form of the invention, as shown in FIG. 5, instead of the net 5 being secured directly to the said upwardly-inclined flange 3 it may be secured to an extension 2a of the peripheral wall 2 of the rim, said extension being folded over the end of a cylindrical flange in an annular jig (not shown) while the network 5 is welded to the fold.

As shown in FIGS. 6 to 9 the rim part of the pocket may be of varying forms in cross section and in each case it may be either tubular or solid. It may have one or more attached ears 10 to facilitate its being lifted when it is desired to peel the pocket out of the carrier for washing or the like.

In the embodiment shown in FIG. 6, the rib 1 is provided with an outwardly extending peripheral ear 10, the upper surface of which is tangential to the curvature of the rib, while the cylindrical wall is provided with an extension 2a below the flange 3.

The rim of FIG. 7 is identical to that shown in FIG. 6, with the exception that the extension 2b has been omitted.

In FIG. 8 is shown a pocket having a solid rib or rim 1a, a peripheral ear 10 extending outwardly therefrom, and an extension 2a provided below the flange 3.

The embodiment shown in FIG. 9 is identical to the preferred embodiment of FIGS. 1 and 2 with the exception that a solid rib 1a, having a peripheral ear 10, is substituted for the hollow rib 1 of FIGS. 1 and 2.

FIG. 10 is a sectional view of the rim part of FIGS. 1 and 2, with the netting 5 having been omitted.

It will be seen that in all cases illustrated the peripheral wall of the pocket offers no obstruction or restriction against a batch of dough passing through it. The adhesion between the plastic material of which the pocket is made and the dough is almost nil so that, when the pocket is inverted the dough lump or batch readily falls away from the net.

What I claim is:

1. A dough prover pocket comprising, a carrier having a flanged aperture, a flexible integral network of a non-toxic synthetic plastic material having a surrounding frame of similar material for removably supporting same in the flanged aperture of said carrier, said frame including an outwardly projecting rib adapted to lie on the edge of said carrier around the aperture thereof for supporting said network, a continuous resilient outwardly-projecting flange for embracement under the flanged edge of the aperture of said carrier and an inwardly-directed flange for the securement of said network thereto.

2. In combination, a carrier provided with spaced openings each flanged downwardly at the edge, a dough pocket removably supported in each of the openings of said carrier comprising a frame of synthetic plastic material having a flexible integral network of similar material attached thereto, said frame including a hollow round-sectioned rib adapted to rest on said carrier, a cylindrical wall joining said rib and a continuous upwardly-inclined external flange and adapted to rest on the flanged edge of one of the openings with said upwardly-inclined external flange adapted for snapping under said flanged edge to retain the pocket in the opening, and a downwardly-inclined flange tangential to the curvature of said hollow rib to which said network is secured.

References Cited in the file of this patent

UNITED STATES PATENTS

| Re. 14,761 | Pfeil | Nov. 25, 1919 |
| 1,364,695 | Boyan | Jan. 4, 1921 |
| 1,888,038 | Hoiland et al. | Nov. 15, 1932 |
| 2,015,087 | Rafton | Sept. 24, 1935 |
| 2,071,845 | Kowalski | Feb. 23, 1937 |
| 2,097,885 | Koppe | Nov. 2, 1937 |
| 2,239,255 | Shaw | Apr. 22, 1941 |
| 2,640,445 | Reget | June 2, 1953 |
| 2,840,162 | Moerdyk | June 24, 1958 |
| 2,984,334 | Dungfelder et al. | May 16, 1961 |

FOREIGN PATENTS

| 484,984 | Italy | Sept. 26, 1953 |